3,153,677
ALKYLATION OF AROMATICS IN THE PRESENCE OF $W_2O_5$ CATALYST
Lionel Domash, Wilkins Township, Allegheny County, Raymond C. Odioso, Glenshaw, and Stephen L. Peake, Pittsburgh, Pa., assignors to Gulf Research & Development Company, Pittsburgh, Pa., a corporation of Delaware
No Drawing. Filed Apr. 21, 1961, Ser. No. 104,524
7 Claims. (Cl. 260—671)

This invention relates to an alkylation process and more particularly to the alkylation of aromatic hydrocarbons with olefins in the presence of a specific catalyst.

It is known in the prior art to alkylate aromatics such as benzene and toluene with olefins such as ethylene and propylene to produce compounds that are valuable as chemical intermediates or as components of high octane gasoline. For example, the meta- and para-isomers of cymene produced by alkylating toluene with propylene have very high blending octane numbers and are valuable as gasoline components. They are also valuable as intermediates in the production of dibasic aromatic acids. Cumene, for example, which can be obtained by alkylating benzene with propylene can be oxidized to obtain a phenol.

Various catalysts have been proposed for alkylation of aromatics with olefins. These include acid catalysts such as hydrogen fluoride and sulfuric acid, which are employed in the liquid or gaseous state. However, these highly corrosive fluid catalysts have certain drawbacks, including the difficulty of recovering uncontaminated hydrocarbon products, and recent developments have led to the use of catalysts such as solid cracking catalysts of the silica-alumina type for certain alkylation reactions. We have now made a valuable improvement in the alkylation of aromatics with olefins in the presence of a tungstic oxide ($W_2O_5$) catalyst.

The aromatic charge stock which can be employed in the alkylation reaction of our invention can be any aromatic susceptible to alkylation. Suitable aromatics include the following: benzene, toluene, xylenes, ethylbenzene, cumene, n-propylbenzene and other mono- and poly-alkylbenzenes, naphthalene and mono- and poly-alkylnaphthalenes, phenols and mono- and poly-alkylphenols, etc. Mononuclear aromatics, particularly benzene and toluene, are preferred. The charge stock can be a single such aromatic hydrocarbon or a mixture of two or more of the same, or can be a hydrocarbon fraction having a high concentration of mononuclear aromatics, e.g., 50 percent or higher, and containing other hydrocarbons, such as paraffins, that are normally present in petroleum distillate fractions boiling in the range of the particular mononuclear aromatics.

The olefins employed in the alkylation reaction with the aromatic defined above are olefins of the $C_2$ to $C_5$ range. Olefins which can be employed include ethylene, propylene, n-butene, isobutene, n-pentenes and isopentenes. The preferred olefin is propylene. In the reaction we can employ a single highly purified olefin or a mixture of two or more olefins or a fraction rich in one or more of the olefins and containing paraffins or other hydrocarbons of similar boiling range.

As noted the alkylation catalyst employed herein is tungstic oxide ($W_2O_5$). The surface area of tungstic oxide as determined by nitrogen absorption measurements is in the range of 15 to 20 square meters per gram. This is low when its surface area is compared with that of an excellent catalyst such as a Triple A silica-alumina catalyst which has a surface area in the range of about 460 to 480 square meters per gram. And yet, unexpectedly, tungstic oxide is about as effective an alkylation catalyst in this context as Triple A silica-alumina catalyst.

Tungstic oxide can be used alone in the herein-defined alkylation reaction or it can be mounted on a suitable base. An excellent base for this purpose is a silica-alumina composite such as the silica-aluminas which are generally employed as cracking catalysts. Preferred silica-aluminas contain about 20 to 30 percent by weight of alumina, the remainder being essentially silica. A particularly valuable base of this type is the silica-alumina catalyst containing about 25 per cent alumina marketed by American Cyanamid Company under the name of Aerocat Triple A High Alumina catalyst. The silica-alumina base can be prepared by any of the known methods for preparing synthetic silica-alumina compositions, including coprecipitation and cogelation. The tungstic oxide can be deposited on the base in any suitable manner. Thus the base can be impregnated with ammonium metatungstate, dried at a temperature of about 225° to about 275° F. for 24 hours and then calcined at a temperature of about 1000° F. for 10 hours. The amount of tungstic oxide on the base can be from about three to about 50 percent by weight thereof.

In carrying out the alkylation reaction of this invention the charge aromatic and olefin are passed over the catalyst at a liquid-hourly space velocity of about one to about six, preferably about one to about three, volumes of hydrocarbon per volume of catalyst per hour. In the process defined herein space velocity is defined as the number of liquid volumes of aromatic plus olefin (the olefin being considered as dissolved in ideal solution) per volume of catalyst per hour (hereinafter abbreviated as vol./vol./hr.). Temperatures of about 250° to about 650° F., preferably about 300° to about 500° F., and pressures of about 400 to about 1500 pounds per square inch gauge, preferably about 750 to about 1000 pounds per square inch gauge, can be employed. An aromatic to olefin molar ration of about 1:1 to about 10:1, preferably about 2:1 to about 5:1 can be employed.

Upon completion of the reaction the product obtained can be separated into its individual components by any suitable means. Thus, the reaction product can be cooled to atmospheric temperature and depressured to atmospheric pressure, whereupon unreacted olefin, if present, can be flashed off. The unreacted aromatic and alkylated aromatic hydrocarbon can be separated from each other by fractionation at suitable temperatures and pressures.

During the alkylation reaction a small amount of polyalkylation occurs. We have discovered that the selectivity of the alkylation reaction to monoalkylate can be increased by recycling polyalkylate to the alkylation reaction zone.

The invention can further be illustrated by reference to the following examples.

EXAMPLE I

Into a tubular reactor measuring 36 inches long and having an inner diameter of 1.0 inch there was placed 79.4 grams of tungstic oxide on Triple A silica-alumina, the whole having a particle size of 10–20 mesh. The catalyst was obtained by impregnating 400 grams of Triple A silica-alumina with 375 cc. of a 36.8 percent aqueous solution of ammonium metatungstate. The resulting material was dried at a temperature of 235° F. for 24 hours and calcined at a temperature of 1000° F. for nine hours. The catalyst so obtained contained 23.8 percent by weight tungsten as tungstic oxide. The feed consisted of a mixture of pure grade toluene and high purity (97 to 99 percent) propylene in a ratio of two mols of toluene per mol of propylene. The liquid feed was pumped upflow through the fixed bed of catalyst at a liquid-hourly space velocity of two volumes of total hydrocarbons per volume of catalyst per hour. Reactor pressure was 1000 pounds per square inch gauge, and four runs were made, two at 300° F. and two at 450° F. Results of these runs are tabulated below in Table I.

*Table I*

| Run No. | 1 | 2 | 3 | 4 |
|---|---|---|---|---|
| Temperature, ° F | 300 | 300 | 450 | 450 |
| Conversion of Toluene, Mol Percent | 33.5 | 31.1 | 35.8 | 35.8 |
| Efficiency of Conversion, Mol Percent to: | | | | |
| Benzene | 0.4 | 0.5 | 0.4 | 0.4 |
| Cymenes: | | | | |
| Ortho | 23.7 | 23.4 | 13.9 | 13.6 |
| Meta | 15.8 | 14.6 | 28.2 | 30.6 |
| Para | 32.7 | 29.8 | 35.4 | 35.4 |
| 3,5-Diisopropyltoluene | 4.4 | 2.7 | 6.3 | 6.3 |
| Others (Polyalkylate and Polymers) | 23.0 | 29.0 | 15.8 | 13.7 |
| Distribution of Monoalkylate, Mol Percent: | | | | |
| Ortho | 32.8 | 34.5 | 17.9 | 17.1 |
| Meta | 21.9 | 21.5 | 36.4 | 38.4 |
| Para | 45.3 | 44.0 | 45.7 | 44.5 |

EXAMPLE II

The procedure of Example I was repeated several times except that 193.4 grams of unsupported tungstic oxide having a particle size of 10–20 mesh was employed. The data obtained are tabulated below in Table II.

*Table II*

| Run No. | 5 | 6 | 7 | 8 |
|---|---|---|---|---|
| Temperature, ° F | 300 | 300 | 450 | 450 |
| Conversion of Toluene, Mol Percent | 32.3 | 28.8 | 30.9 | 28.1 |
| Efficiency of Conversion, Mol Percent to: | | | | |
| Benzene | 0.4 | 0.4 | 0.4 | 0.4 |
| Cymenes: | | | | |
| Ortho | 17.4 | 20.0 | 20.6 | 21.8 |
| Meta | 22.0 | 19.5 | 13.3 | 15.3 |
| Para | 32.7 | 33.3 | 33.7 | 35.9 |
| 3,5-Diisopropyltoluene | 3.4 | 3.1 | 0 | 0 |
| Others (Polyalkylate and Polymers) | 24.0 | 23.7 | 31.8 | 25.7 |
| Distribution of Monoalkylate, Mol Percent: | | | | |
| Ortho | 24.1 | 27.5 | 30.5 | 29.9 |
| Meta | 30.5 | 26.8 | 19.7 | 21.0 |
| Para | 45.4 | 45.7 | 49.9 | 49.2 |

EXAMPLE III

To additional runs were carried out using the same catalyst system of Example II. The feed consisted of a mixture of pure grade benzene and high purity (97 to 99 percent) propylene in a ratio of three mols of benzene to one mol of propylene. The liquid-hourly space velocity in Runs Nos. 9 and 10 was two and three, respectively, and the pressure in each instance was 1000 pounds per square inch gauge. The data obtained are tabulated below in Table III.

*Table III*

| Run No. | 9 | 10 |
|---|---|---|
| Temperature, ° F | 450 | 550 |
| Conversion of Benzene, Mol Percent | 21.2 | 24 |
| Efficiency of Conversion, Mol Percent to: | | |
| Cumene | 70 | 71 |
| Diisopropylbenzenes | 18 | 21 |
| Higher Polyalkylates and Polymers | 12 | 8 |

A study of the data tabulated above in Tables I, II and III illustrate the effectiveness of tungstic oxide as a catalyst in the alkylation of an aromatic with an olefin, whether the tungstic oxide be employed alone or mounted on a suitable base. We have found, for example, that tungstic oxide is about as effective a catalyst in this context as is Triple A silica-alumina catalyst. Note that tungstic oxide is an effective catalyst over a wide temperature range. In fact in Table I it can be seen that at a temperature of 450° F. the product distribution was favored toward the more desirable meta- and para-cymenes. When a temperature of 550° F. was employed in Run No. 10 the conversion of benzene to cumene was as good as that obtained in Run No. 9 at a temperature of 450° F., and since the liquid-hourly space velocity in Run No. 10 was three and in Run No. 9 two, it is apparent that more efficient utilization of catalyst and reactor can be obtained at the higher temperature.

That the selectivity of conversion of aromatic to alkylated aromatic having but one more alkyl group than the charge aromatic is enhanced by the expedient of recycling polyalkylate to the reactor is apparent from a study of Example IV.

EXAMPLE IV

Run No. 10 was repeated twice with the exception that the aromatic charge contained five percent by weight of diisopropylbenzene. Five percent of diisopropylbenzene was used because in general it was found that the amount of diisopropylbenzene obtained in the reactions defined herein amounted to about five percent. The data obtained are tabulated below in Table IV.

*Table IV*

| Run No. | 11 | 12 |
|---|---|---|
| Temperature, ° F | 550 | 550 |
| Conversion of Benzene, Mol Percent | 26.2 | 23.7 |
| Efficiency of Conversion, Mol Percent to: | | |
| Cumene | 84.3 | 86.8 |
| Diisopropylbenzene | 6.6 | 9.9 |
| Higher Polyalkylates and Polymers | 9.1 | 3.3 |

The average conversion in Runs Nos. 11 and 12 amounted to 24.9 mol percent, and efficiency of conversion to cumene amounted to 85.5 mol percent. It can be seen therefore that the presence in the reactor system of an amount of polyalkylate in the charge equivalent to that which would be present in recycle did not adversely affect the conversion but that the selectivity to cumene was increased by about 20 percent.

Obviously, many modifications and variations of the invention, as hereinabove set forth can be made without departing from the spirit and scope thereof, and therefore only such limitations should be imposed as are indicated in the appended claims.

We claim:
1. A process which comprises alkylating an aromatic susceptible to alkylation with an olefin having from two to five carbon atoms in the presence of a catalyst consisting essentially of tungstic oxide ($W_2O_5$), the alkylation conditions including a temperature of about 250° to about 650° F., a pressure of about 400 to about 1500 pounds per square inch gauge, an aromatics to olefin molar ratio of about 1:1 to about 10:1 and a liquid hourly space velocity of about one to about six.

2. A process which comprises alkylating toluene with an olefin having from two to five carbon atoms in the presence of a catalyst consisting essentially of tungstic oxide ($W_2O_5$), the alkylation conditions including a temperature of about 250° to about 650° F., a pressure of about 400 to about 1500 pounds per square inch gauge, an aromatics to olefin molar ratio of about 1:1 to about 10:1 and a liquid hourly space velocity of about one to about six.

3. A process which comprises alkylating benzene with an olefin having from two to five carbon atoms in the presence of a catalyst consisting essentially of tungstic oxide ($W_2O_5$), the alkylation conditions including a temperature of about 250° to about 650° F., a pressure of about 400 to about 1500 pounds per square inch gauge, an aromatics to olefin molar ratio of about 1:1 to about 10:1 and a liquid hourly space velocity of about one to about six.

4. A process which comprises alkylating an aromatic susceptible to alkylation with propylene in the presence of a catalyst consisting essentially of tungstic oxide ($W_2O_5$), the alkylation conditions including a temperature of about 250° to about 650° F., a pressure of about 400 to about 1500 pounds per square inch gauge, an aromatics to olefin molar ratio of about 1:1 to about 10:1 and a liquid hourly space velocity of about one to about six.

5. A process which comprises alkylating toluene with propylene in the presence of a catalyst consisting essentially of tungstic oxide ($W_2O_5$), the alkylation conditions including a temperature of about 250° to about 650° F., a pressure of about 400 to about 1500 pounds per square inch gauge, an aromatics to olefin molar ratio of about 1:1 to about 10:1 and a liquid hourly space velocity of about one to about six.

6. A process which comprises alkylating benzene with propylene in the presence of a catalyst consisting essentially of tungstic oxide ($W_2O_5$), the alkylation conditions including a temperature of about 250° to about 650° F., a pressure of about 400 to about 1500 pounds per square inch gauge, an aromatics to olefin molar ratio of about 1:1 to about 10:1 and a liquid hourly space velocity of about one to about six.

7. A process which comprises alkylating an aromatic susceptible to alkylation with an olefin having from two to five carbon atoms in the presence of a catalyst consisting essentially of tungstic oxide ($W_2O_5$), the alkylation condition including a temperature of about 250° to about 650° F., a pressure of about 400 to about 1500 pounds per square inch gauge, an aromatics to olefin molar ratio of about 1:1 to about 10:1 and a liquid hourly space velocity of about one to about six while recycling to the reaction zone polyalkylate formed therein.

References Cited in the file of this patent
UNITED STATES PATENTS

| | | |
|---|---|---|
| 2,691,647 | Field et al. | Oct. 12, 1954 |
| 2,882,325 | Luvisi et al. | Apr. 14, 1959 |